(12) United States Patent
Slusarz et al.

(10) Patent No.: US 12,146,420 B2
(45) Date of Patent: Nov. 19, 2024

(54) AIRCRAFT TURBOMACHINE BLADE AND METHOD FOR MANUFACTURING SAME USING LOST-WAX CASTING

(71) Applicant: SAFRAN AIRCRAFT ENGINES, Paris (FR)

(72) Inventors: Michel Slusarz, Moissy-Cramayel (FR); Pierre Guillaume Auzillon, Moissy-Cramayel (FR); Patrice Eneau, Moissy-Cramayel (FR); Léandre Ostino, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 40 days.

(21) Appl. No.: 17/440,853

(22) PCT Filed: Mar. 11, 2020

(86) PCT No.: PCT/FR2020/050496
§ 371 (c)(1),
(2) Date: Sep. 20, 2021

(87) PCT Pub. No.: WO2020/193899
PCT Pub. Date: Oct. 1, 2020

(65) Prior Publication Data
US 2022/0170371 A1     Jun. 2, 2022

(30) Foreign Application Priority Data
Mar. 22, 2019   (FR) ....................................... 1903021

(51) Int. Cl.
*F01D 5/18*      (2006.01)
*F01D 5/14*      (2006.01)

(52) U.S. Cl.
CPC .............. *F01D 5/147* (2013.01); *F01D 5/187* (2013.01); *F05D 2220/32* (2013.01); *F05D 2230/21* (2013.01)

(58) Field of Classification Search
CPC .............. F01D 5/187; F05D 2260/2212; F05D 2260/22141; F05D 2240/127
See application file for complete search history.

(56) References Cited

U.S. PATENT DOCUMENTS 4,407,632 A * 10/1983 Liang ...................... F01D 5/187
                                                          415/115
7,163,373 B2 * 1/2007 Liang ........................ F01D 5/18
                                                          415/115
(Continued)

FOREIGN PATENT DOCUMENTS

CN          104493081 B     7/2016
EP          0 945 595 A2    9/1999
(Continued)

OTHER PUBLICATIONS

English translation of Written Opinion mailed Jun. 25, 2020, issued in corresponding International Application No. PCT/FR2020/050496, filed Mar. 11, 2020, 7 pages.
(Continued)

*Primary Examiner* — Brian P Wolcott
*Assistant Examiner* — Behnoush Haghighian
(74) *Attorney, Agent, or Firm* — CHRISTENSEN O'CONNOR JOHNSON KINDNESS PLLC

(57) ABSTRACT

An aircraft turbine engine blade includes at least one inner cavity for circulating a ventilation air flow and having a wall with first projecting elements oriented in a first direction and forming air flow disrupters, and at least a second projecting element oriented in a second direction different from the first direction. The second projecting element and at least one of the first projecting elements overlap each other in one area.

(Continued)

At least one of the first projecting elements overlaps the second projecting element and has a height (H2, H4') which is greater than that of the second projecting element in the area and greater than that of the other first projecting elements of the wall, in order to retain its disruptive function along the entire length thereof.

9 Claims, 4 Drawing Sheets

(56) References Cited

U.S. PATENT DOCUMENTS

| | | | | |
|---|---|---|---|---|
| 7,275,585 | B1* | 10/2007 | Guerche | B29C 67/241 164/45 |
| 7,690,894 | B1* | 4/2010 | Liang | F01D 5/187 415/115 |
| 7,938,624 | B2* | 5/2011 | Tibbott | F23R 3/002 415/115 |
| 9,297,261 | B2* | 3/2016 | Otero | F01D 5/187 |
| 9,500,093 | B2* | 11/2016 | Papple | F01D 9/065 |
| 9,638,057 | B2* | 5/2017 | Kwon | F01D 5/187 |
| 9,771,809 | B2* | 9/2017 | Fujimoto | F01D 5/187 |
| 9,810,071 | B2* | 11/2017 | Papple | F01D 5/18 |
| 9,957,812 | B2* | 5/2018 | Okita | F01D 5/187 |
| 10,196,900 | B2* | 2/2019 | King | B23P 19/00 |
| 10,247,099 | B2* | 4/2019 | Quach | F01D 5/187 |
| 11,339,718 | B2* | 5/2022 | Arisi | F01D 11/08 |
| 2006/0171808 | A1* | 8/2006 | Liang | F01D 5/18 416/97 R |
| 2007/0235160 | A1* | 10/2007 | Guerche | B22C 9/04 164/45 |
| 2009/0183850 | A1* | 7/2009 | Morrison | B22F 5/009 164/91 |
| 2011/0016717 | A1* | 1/2011 | Morrison | B22F 3/225 29/889.72 |
| 2012/0000072 | A9* | 1/2012 | Morrison | B22F 3/105 29/889.72 |
| 2014/0290256 | A1* | 10/2014 | Fujimoto | F01D 5/187 60/752 |
| 2014/0290257 | A1* | 10/2014 | Okita | F01D 5/189 60/752 |
| 2015/0016947 | A1* | 1/2015 | Kwon | F01D 5/187 415/1 |
| 2015/0093252 | A1* | 4/2015 | Papple | F01D 5/18 416/97 R |
| 2016/0169000 | A1* | 6/2016 | King | B23P 19/00 29/889.22 |
| 2016/0208620 | A1* | 7/2016 | Thistle | F01D 5/187 |
| 2016/0230664 | A1* | 8/2016 | Quach | F02C 7/18 |

FOREIGN PATENT DOCUMENTS

| | | |
|---|---|---|
| EP | 3 450 683 A1 | 3/2019 |
| FR | 2 874 186 A1 | 2/2006 |

OTHER PUBLICATIONS

International Preliminary Report on Patentability mailed Sep. 28, 2021, issued in corresponding International Application No. PCT/FR2020/050496, filed Mar. 11, 2020, 6 pages.

International Search Report mailed Jun. 25, 2020, issued in corresponding International Application No. PCT/FR2020/050496, filed Mar. 11, 2020, 7 pages.

Written Opinion mailed Jun. 25, 2020, issued in corresponding International Application No. PCT/FR2020/050496, filed Mar. 11, 2020, 5 pages.

* cited by examiner

AIRCRAFT TURBOMACHINE BLADE AND METHOD FOR MANUFACTURING SAME USING LOST-WAX CASTING

FIELD OF THE DISCLOSURE

The present disclosure relates in particular to an aircraft turbine engine blade and its method of manufacture by lost-wax casting.

BACKGROUND

The state of the art comprises in particular document FR-A1-2 874 186 of the Applicant and documents EP-A1-3 450 683, US-A1-2016/208620, EP-A2-0 945 595, CN-B-104 493 081 and US-A1-2011/016717.

Turbine engine blades and in particular turbine blades are subjected to high thermal stresses and comprise inner cavities for circulating a ventilation fluid, generally air in the case of a gas turbine engine.

These blades are now generally manufactured by lost-wax casting. This technique consists of making a model made of wax or other equivalent provisional material, of the part that is sought to be cast. The model is wrapped in a ceramic shell cast. This is manufactured by successive dipping of the model in cement slurries containing a ceramic material and the filling of the layer formed between each dipping. The cast is dried, the wax that it contains is removed by a first cooking at an adapted temperature, then the cast is cooked at a high temperature to give it the resistance necessary for the molding. Thus, the image of the hollow model remains wherein the molten metal is molded. After cooling, the cast is broken to release the part. This then undergoes a simple finishing treatment.

When the blade comprises cavities for the circulation of the cooling air flow, one or more cores must be incorporated in the model. This phase of the method first comprises the separate manufacturing of the core(s) by casting a ceramic material consolidated by a binding agent, their assembly if necessary, and the implementation of the core(s) in a wax cast. Thus, a model is cast by injecting wax in the wax cast. The model forms the replica of the part to be obtained.

In FIG. 1, in a cross-section perpendicular to the axis of the part, a wax cast 10 is represented, of which the inner wall is the image of the part to be obtained. This cast is here in two parts 10A and 10B. A core 12 is disposed in this cast. The core 12 here is composed of a plurality of branches 12A and 12G parallel to one another and connected to a common root. The branches together define spaces which will form partitions after molding of the metal. To ensure the wedging of the core 12 inside the cast, spacers 14 are provided, for example made of platinum. The function of these spacers is to maintain a space between the walls of the core 12 and the inner wall 16 of the cast, even possibly between the branches 12A-12G of the core. When wax is injected, it is thus avoided that, by an inappropriate displacement of the core, the layers and the partitions formed are irregular.

As is represented in FIG. 2, the abovementioned spacers 14 are housed in hollow units of the wall of the core 12. These units can be obtained at the time of the formation of the core, or be machined. The spacers 14 generally have an elongated shape, like a rod or a needle, and are placed on the core by being layered in the direction of its length (which extends along the longitudinal axis of the blade, which is an axis substantially radial with respect to the longitudinal axis of the turbine engine, wherein it is mounted). These hollow units extend therefore in a particular direction.

A core 12 further comprises other hollow units 18 on its wall which extend in another direction, to define fluid flow disrupters in the cavity of the blade. As can be seen in FIG. 2, it occurs that the hollow units 18 intended to define the disrupters and the housings of the spacers 14 are combined or at least overlap each other.

The following step consists of forming a ceramic cast around the model obtained after its extraction of the cast 10. The wax is then removed from the cast, then the molten metal is molded in the cast and fills the space between the walls of the cast and those of the core. After a suitable treatment, the elements constituting the core are removed to obtain the cavities. The part and in particular the blade 20 represented in FIG. 3 are obtained.

The molten metal is intended to occupy the spaces between the branches 12A-12G and between the core and the cast to form the partitions and the walls of the cavities 22, and also to occupy the recesses of the hollow units of the core to form projecting elements 24 on these walls of the cavities (see FIG. 3). As mentioned above, due to the overlapping of certain hollow units of the core, certain projecting elements overlap each other in the cavities of the blade.

However, in these overlapping areas, the disrupters lose their function and do not cause turbulences in the ventilation air flow, which has a significant impact on the effectiveness of the cooling of the blade by significantly reducing the thermal exchange coefficient between the blade and this flow.

The disclosure aims to overcome this problem and to make sure that the function of the disrupters in the cavity of a blade is not altered by the presence and the overlapping of other projecting elements of this cavity.

SUMMARY

The present disclosure relates to an aircraft turbine engine blade, this blade comprising at least one inner cavity for circulating a ventilation air flow, this cavity comprising a wall which comprises first projecting elements oriented in at least one first direction and forming air flow disrupters, this wall further comprising at least one second projecting element oriented in at least one second direction different from the first direction, this second element and at least one of the first elements overlapping each other in one area, characterised in that the or each first element which overlaps the second elements has a height which is greater than that of the second element in the area and which is greater than that of the other first elements of the wall, in order to retain its disruptive function along the entire length thereof. In the present application, by height of a projecting element, this means a dimension of this element measured along a direction normal to the surface over which it is projected.

It is therefore understood that, although the first and second elements can overlap, the first elements are always higher than the second element and are therefore always projecting inside the cavity so as to retain their flow disruptive function.

The blade according to the disclosure can comprise one or more of the following characteristics, taken individually from one another or in combination with one another:
  the directions of the first and second elements are substantially perpendicular to one another;
  the directions of the first and second elements are inclined with respect to one another;
  the or each first element and/or the second elements has a general elongated shape;

only one of the first elements overlaps the second elements and forms a cross with the latter;

two of the first elements overlap the element and form branches on two opposite sides of this second element;

the or each first element which overlaps the second element has a height which varies and is maximum in the area.

The present disclosure also relates to a ceramic core for the manufacture of a blade such as described above, by a method for manufacturing by lost-wax casting, this core comprising a part configured to form the cavity and comprising, on the one hand, first hollow units oriented in at least one first direction and configured to form the projecting elements, and on the other hand, at least one second hollow unit oriented in at least one second direction different from the first direction and forming a housing for a spacer, this second unit and at least one of the first units overlapping each other in an area, characterised in that the or each first unit which overlaps the second unit has a depth greater than that of the second unit in the area.

In the present application, by depth of a hollow unit, this means a dimension of this unit measured along a direction normal to the bottom surface of this unit.

The present disclosure also relates to a method for manufacturing a blade such as described above, by a method for manufacturing by lost-wax casting, by means of a ceramic core such as described above.

DESCRIPTION OF THE DRAWINGS

Other characteristics and advantages of the disclosure will appear upon reading the detailed description below, of which to understand, the appended drawings can be referred to, wherein.

DETAILED DESCRIPTION

Figure 1:
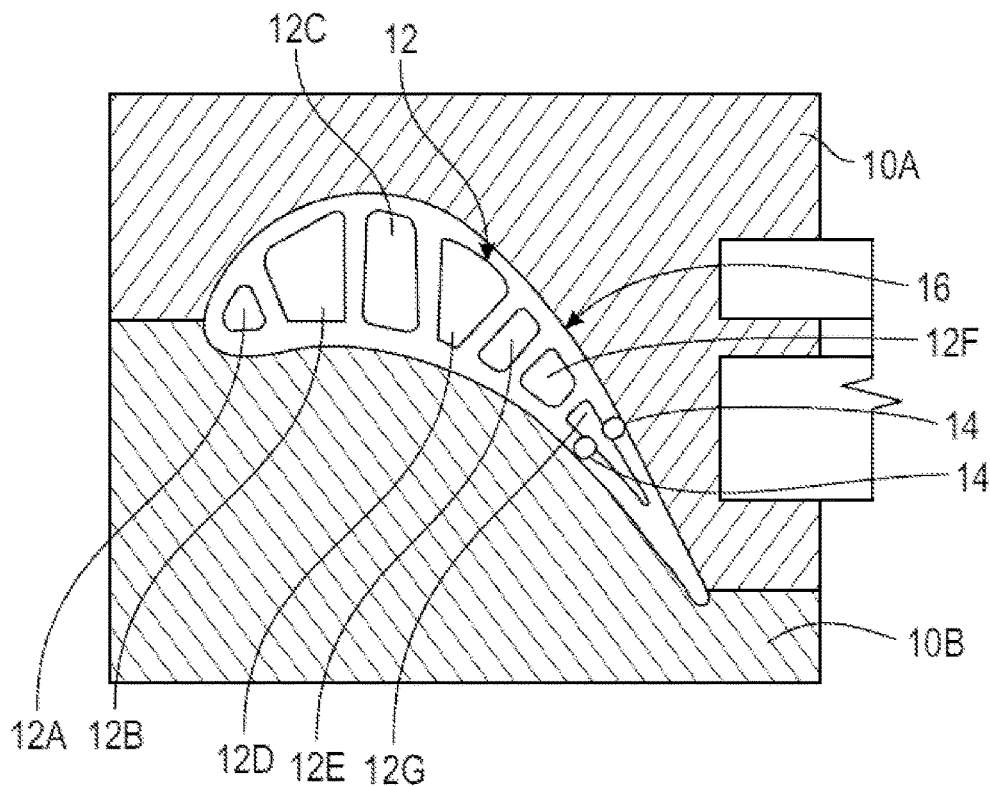
FIG. 1 is a schematic, transverse cross-sectional view of a cast and of a ceramic core for the manufacture of a blade by lost-wax casting.
Figure 2:
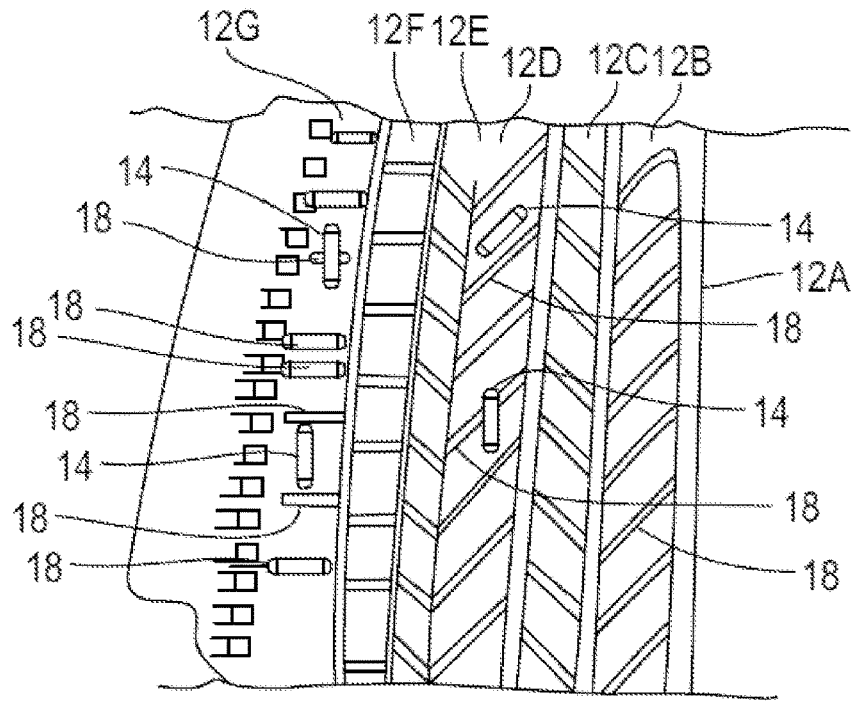
FIG. 2 is a schematic, axial cross-sectional view of a cast and of a ceramic cast for the manufacture of a blade by lost-wax casting.
Figure 3:
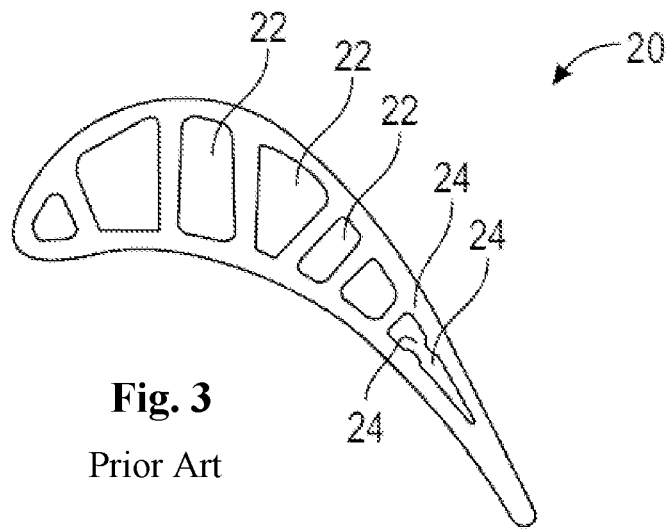
FIG. 3 is a schematic, transverse cross-sectional view of a turbine engine blade.

FIGS. 1 to 3 have been described above and illustrate the prior art. They also illustrate the disclosure insofar as the description of these figures applies to the disclosure.

Figure 4:
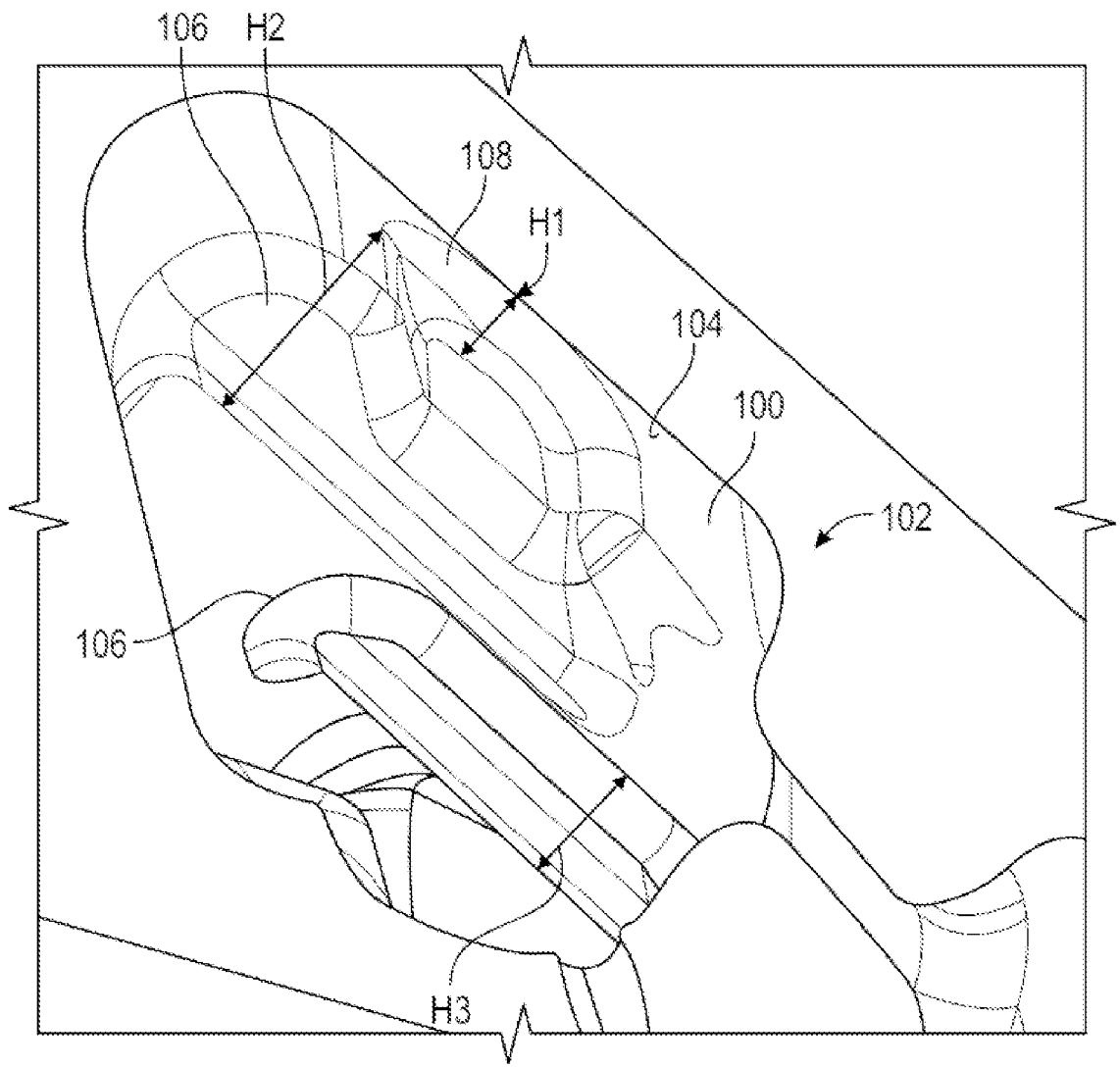
FIG. 4 is a schematic, partial, perspective view of a cavity of a turbine engine blade, and illustrates an embodiment of the disclosure.
Figure 5:
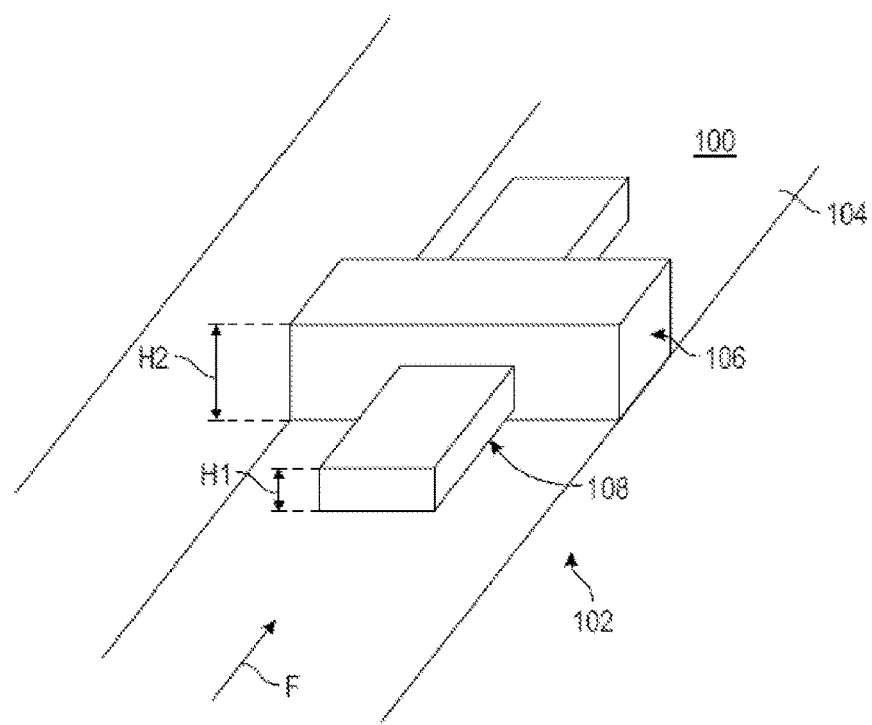
FIG. 5 is a very schematic view illustrating the embodiment of FIG. 4.

FIGS. 4 and 5 illustrate a first embodiment of the disclosure. FIG. 4 shows a cavity 100 of a blade 2 which is partially visible and which can be considered as similar to that represented in FIG. 3.

The cavity 100 has a general elongated shape and is formed, thanks to a core, as mentioned above and in a known manner by a person skilled in the art who specialises in manufacturing a blade by lost-wax casting.

The cavity 100 comprises a wall 104 on which are located projecting elements 106, 108.

In the present application, by a first projecting element, referenced 106, this means an element which is configured to form an air flow disrupter. The air flow F which flows in the cavity will have to bypass this element which will create turbulences in the air flow and thus favour thermal exchanges between this air flow F and the wall 104 (FIG. 5).

An element 106 generally has a general elongated shape and can have a parallelepiped, cylindrical shape, etc.

An element 106 extends in a particular direction and the elements 106 of one same cavity 100 can extend parallel to one another. Generally, they extend in a direction which is perpendicular or inclined with respect to the direction of the flow of the air flow F in the cavity 100 to form obstacles to this flow.

In the present application, by a second projecting element, referenced 108, this means an element which results from the method for manufacturing the blade 102 and which has no particular function within the cavity 100.

This second element 108 is oriented in a second direction different from the first direction and which is generally parallel to the direction of flow of the flow F in the cavity.

As can be seen in the drawings and as this is mentioned above, elements 106, 108 can overlap each other.

In the embodiment of FIGS. 4 and 5, only one of the first elements 106 overlaps a second element 108, substantially in its centre, to form a cross. The directions of the first and second elements 106, 108 are therefore substantially perpendicular in the example represented.

The second element 108 has a height H1 which is constant. The first element 106 which overlaps the second element 108 has a height H2 which is greater than H1. The height H2 of the first element 106 is also constant. FIG. 4 allows to observe that the height H2 can be greater than the height H3 of the other first elements of the cavity which do not overlap a second element. H3 can moreover be similar to H1.

Figure 6:
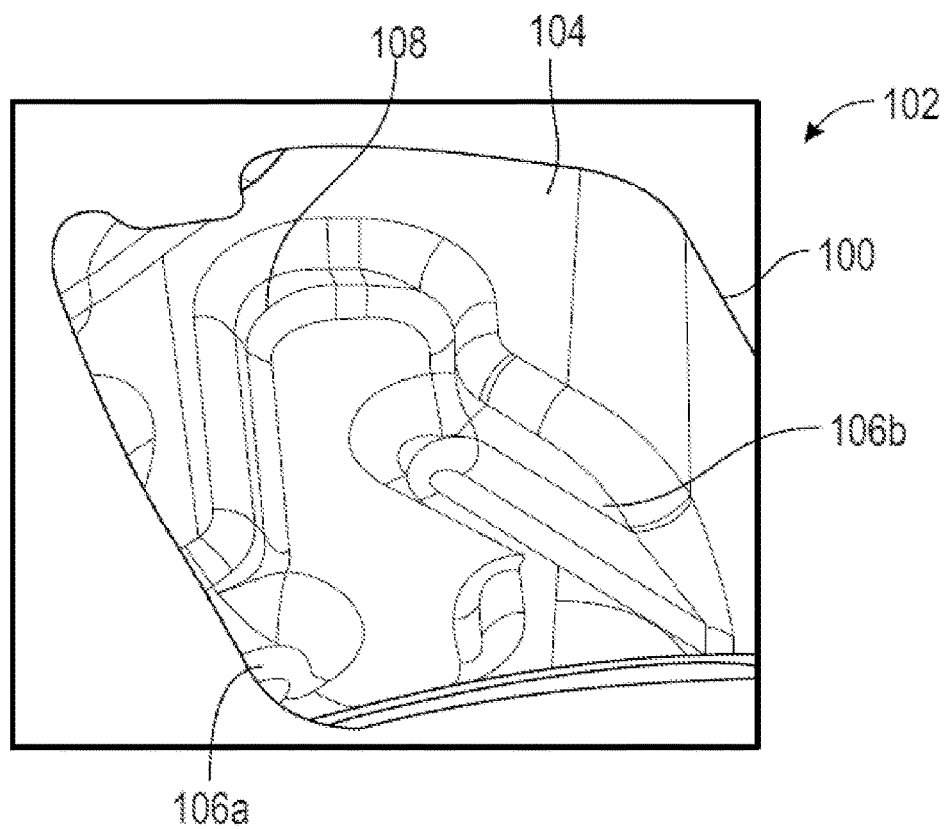
FIG. 6 is a partial, perspective schematic view of a cavity of a turbine engine blade, and illustrates another embodiment of the disclosure.
Figure 7:
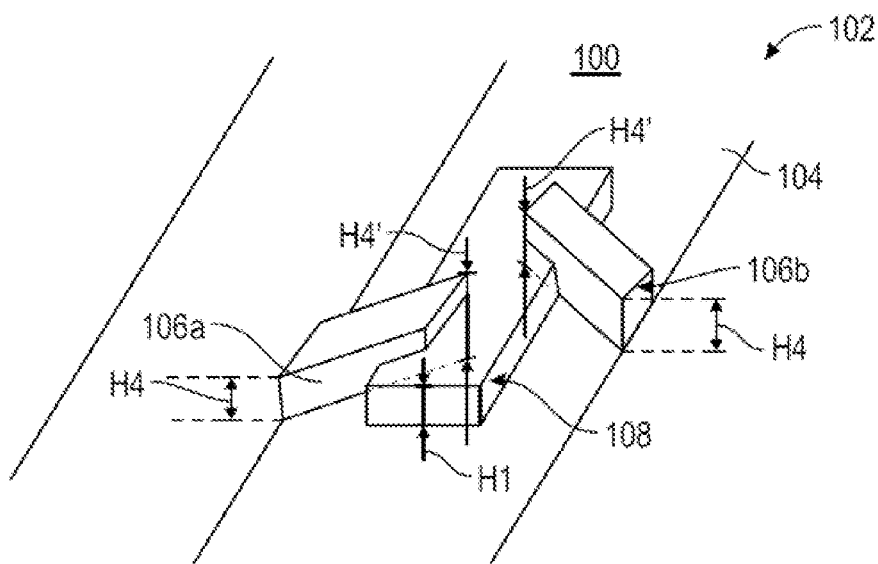
FIG. 7 is a very schematic view illustrating the embodiment of FIG. 6.
Figure 8:
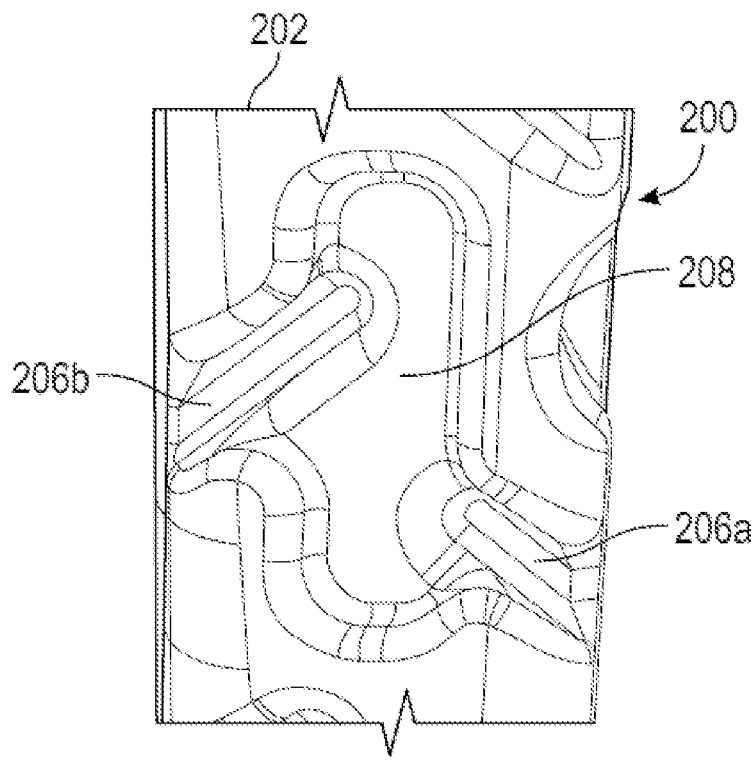
FIG. 8 is a partial, perspective schematic view of hollow units of a core to make the cavity of the embodiment of FIG. 6.

FIGS. 6 and 7 illustrate a second embodiment of the disclosure. FIG. 6 shows a cavity 100 of a blade 102 which is also partially visible.

The cavity 102 is similar to that of the preceding embodiment and comprises, on its wall 104, a second projecting element 108 which is also similar to that described above.

The wall 104 further comprises first projecting elements 106a, 106b different from those 106 described above.

Each element 106a, 106b has a general elongated shape and can have a parallelepiped, cylindrical shape, etc.

The elements 106a, 106b extend in directions inclined with respect to that of the element 108. The elements 106a, 106b are further inclined against one another so as to form a chevron even if they are not contiguous and are spaced from one another in the example represented.

The elements 106a, 106b are here disposed on either side of the element 108 and thus form lateral branches of the element 108. The element 106a extends in an inclined manner and joins an upper end of the element 108, while the element extends in an inclined manner and joins a lower end of the element 108.

The second element 108 has a height H1 which is constant. The elements 106a, 106b have variable heights H4, H4'. The maximum height H4' of the elements 106a, 106b is located at the level of the ends of these elements located in the overlapping areas, while the height H4 is that of the opposite ends of these elements.

The elements 106a, 106b are presented here in the form of rails. The height H4 can be equal to the height of the other first elements of the cavity which do not overlap a second element.

The last figure partially shows a ceramic core 200 for the manufacture of a blade 102 and in particular, of a cavity 100 of this blade according to the second embodiment described above.

This core 200 comprises a part 202 configured to form the cavity 100 and comprises, on the one hand, first hollow units 206a, 206b oriented in first directions and configured to form the elements 106a, 106b, and on the other hand, at least one second hollow unit 208 oriented in a second direction different from the first directions and forming a housing for a spacer 14.

This second unit 208 and the first units 206a, 206b overlap each other in an area and these first units 206a, 206b have a depth greater than that of the second unit 208 in the area. It is therefore understood that the first units 206a, 206b are more recessed (deeper) than the second unit 208 and that these differences in depth are determined to obtain differences in height of the projecting elements 106a, 106b, 108 inside the cavity of the blade to be made.

During the manufacture of the blade by lost-wax casting, the molten metal molded in the cast will occupy the empty spaces left by the wax and the spacers 14. The molten metal will thus occupy the space of the hollow units 206a, 206b, 208 to give the projecting elements 106a, 106b, 108 which can be seen in FIGS. 5 and 6.

The invention claimed is:

1. An aircraft turbine engine blade, comprising at least one inner cavity configured to circulate a ventilation air flow, the cavity comprising a wall that comprises first projecting elements oriented in at least one first direction and forming air flow disrupters, the wall further comprising at least one second projecting element oriented in at least one second direction different from the first direction, wherein the second projecting element and at least one of the first projecting elements overlap each other in an area, at least one of the first projecting elements overlapping the second projecting element and having a height greater than a height of the second projecting element in said area and which is greater than that of the other first projecting elements of the wall, to retain a disruptive function over an entire length thereof, and wherein only one of the first projecting elements overlaps said second projecting element and forms a cross with the second projecting element.

2. The blade according to claim 1, wherein the direction of the first projecting element is perpendicular to a direction of the second projecting element.

3. The blade according to claim 1, wherein the directions of the first and second projecting elements are inclined against one another.

4. The blade according to claim 1, wherein at least one of the first and second projecting elements has an elongate shape.

5. The blade according to claim 1, wherein the or each first projecting element which overlaps said second element has a height which varies and is maximum in said area.

6. A ceramic core for the manufacture of a blade according to claim 1, by a method for manufacturing by lost-wax casting, the core comprising a part configured to form said cavity and comprising:
 first hollow units oriented in at least one first direction and configured to form said projecting elements, and
 at least one second hollow unit oriented in at least one second direction different from the first direction and forming a housing for a spacer, this second unit and at least one of the first units overlapping each other in an area, wherein the or each first unit which overlaps the second unit has a depth greater than that of the second unit in said area.

7. A method for manufacturing a blade according to claim 1.

8. An aircraft turbine engine blade, comprising at least one inner cavity configured to circulate a ventilation air flow, the cavity comprising a wall that comprises first projecting elements oriented in at least one first direction and forming air flow disrupters, the wall further comprising at least one second projecting element oriented in at least one second direction different from the first direction, wherein the second projecting element and at least one of the first projecting elements overlap each other in an area, at least one of the first projecting elements overlapping the second projecting element and having a height greater than a height of the second projecting element in said area and which is greater than that of the other first projecting elements of the wall, to retain a disruptive function over an entire length thereof, and wherein the height of the second projecting element and of the first projecting elements is a dimension of these elements measured along a direction normal to the surface of the wall over which they are projected, and wherein only one of the first projecting elements overlaps said second projecting element and forms a cross with the second projecting element.

9. An aircraft turbine engine blade, comprising at least one inner cavity configured to circulate a ventilation air flow, the cavity comprising a wall that comprises first projecting elements oriented in at least one first direction and forming air flow disrupters, the wall further comprising at least one second projecting element oriented in at least one second direction different from the first direction, wherein the second projecting element and at least one of the first projecting elements overlap each other in an area, at least one of the first projecting elements overlapping the second projecting element and having a height greater than a height of the second projecting element in said area and which is greater than that of the other first projecting elements of the wall which do not overlap the second projecting element, to retain a disruptive function over an entire length thereof, and wherein only one of the first projecting elements overlaps said second projecting element and forms a cross with the second projecting element.

* * * * *